United States Patent [19]

Remmele et al.

[11] Patent Number: 5,031,678
[45] Date of Patent: Jul. 16, 1991

[54] MORTISING MACHINE

[75] Inventors: Berhard Remmele; Joachim Müller, both of Stuttgart, Fed. Rep. of Germany; Kenneth Smith, Bayboro, N.C.

[73] Assignee: Robert Bosch GmbH, Stuttgart, Fed. Rep. of Germany

[21] Appl. No.: 555,396

[22] PCT Filed: Feb. 11, 1989

[86] PCT No.: PCT/DE89/00082
§ 371 Date: Aug. 17, 1990
§ 102(e) Date: Aug. 17, 1990

[87] PCT Pub. No.: WO89/08004
PCT Pub. Date: Sep. 8, 1989

[30] Foreign Application Priority Data

Feb. 27, 1988 [DE] Fed. Rep. of Germany ....... 3806311

[51] Int. Cl.$^5$ .............................................. B27G 19/00
[52] U.S. Cl. .................................. 144/252 R; 408/67; 409/137; 144/82
[58] Field of Search ................... 408/67; 409/137, 295; 144/82, 83, 252 R, 252 A

[56] References Cited

U.S. PATENT DOCUMENTS

| 2,343,875 | 3/1944 | Schwartz | 409/137 |
| 3,942,411 | 3/1976 | Gerber | 409/137 |
| 4,011,792 | 3/1977 | Davis | 409/137 |
| 4,037,982 | 7/1977 | Clement | 409/137 |
| 4,409,699 | 10/1983 | Moorhouse | 144/252 R |
| 4,742,855 | 5/1988 | Hartley | 144/252 R |

Primary Examiner—W. Donald Bray
Attorney, Agent, or Firm—Michael J. Striker

[57] ABSTRACT

A mortising machine comprises a base plate arranged to be located on a surface of a workpiece to be machined and having an opening, a mortising tool extending through the opening of the base plate and arranged to penetrate into the workpiece so as to remove chips and to produce a groove-like recess in the workpiece during displacement of the mortising machine, and a chip removing device provided with a suction opening in the area of the opening of the base plate. The chip removing device is also provided with a second suction opening which is spaced from the first mentioned suction opening so as to open out in the area of the groove-like recess in the workpiece.

10 Claims, 2 Drawing Sheets to # MORTISING MACHINE

BACKGROUND OF THE INVENTION

The present invention relates to a mortising machine.

More particularly, it relates to a mortising machine which is formed as a hand-held machine and has a base plate to be arranged on a surface of a workpiece to be machined, a mortising tool arranged to penetrate into the workpiece to remove chips and extending through an opening in the base plate so as to produce a groove-like recess in the workpiece during displacement of the mortising machine, and a chip removing device provided with a suction opening in the area of the opening of the base plate. In such mortising machines, the dust removing device sucks out the milled chips directly around the mortising cutter. But it is not possible also to completely remove the chips deposited in the mortise groove—at any event, with the conventional suction line.

SUMMARY OF THE INVENTION

Accordingly, it is an object of the present invention to provide a mortising machine which avoids the disadvantages of the prior art.

In keeping with these objects and with others which will become apparent hereinafter, one feature of the present invention resides, briefly stated, in a mortising machine, in which the chip removing device, in addition to the first suction opening, has also a second suction opening, spaced from the first suction opening and open out in the area of a mortising recess at the workpiece.

When the mortising machine is designed in accordance with the present invention, almost all chips can be removed via a second suction which extends close to the mortise groove and in particular is equipped with a deformable body reaching into the groove. The deformable body prevents the chips from exiting through the mortised groove and dams up the milled material. This has the advantage that the dammed up chips can be sucked out via the second suction opening in a closed manner. In accordance with another feature of the present invention, the second suction opening is provided with a deformable body, which can be formed as a broom, projecting forward in the manner of an apron and insertable into the mortised recess so as to hold back the milled chips in a sealing manner. The construction of the deformable body as a broom which is arranged at the rear wall of the second suction opening so as to be adjustable with respect to height and can be inserted into the mortised groove up to the base is particularly advantageous. In accordance with still a further feature of the present invention, a profile, particularly a saw tooth profile, can be arranged in a rear wall of a suction connection piece of the chip removing device, so that the broom is insertable in the profile in a plurality of positions. The multiplestepped sawtooth profile in the rear wall of the suction opening is simple to produce and enables a simple operation of the height adjustment. Moreover, the broom is easily exchangeable. The suction connection piece with the second suction opening is connected with the chip removing device in a simple manner in that it is detachably clamped at a tubular central part of the suction device by means of two elastic clamping arms which are connected in one piece with the suction connection piece. This provides the additional advantage that the suction connection piece can be rotated The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
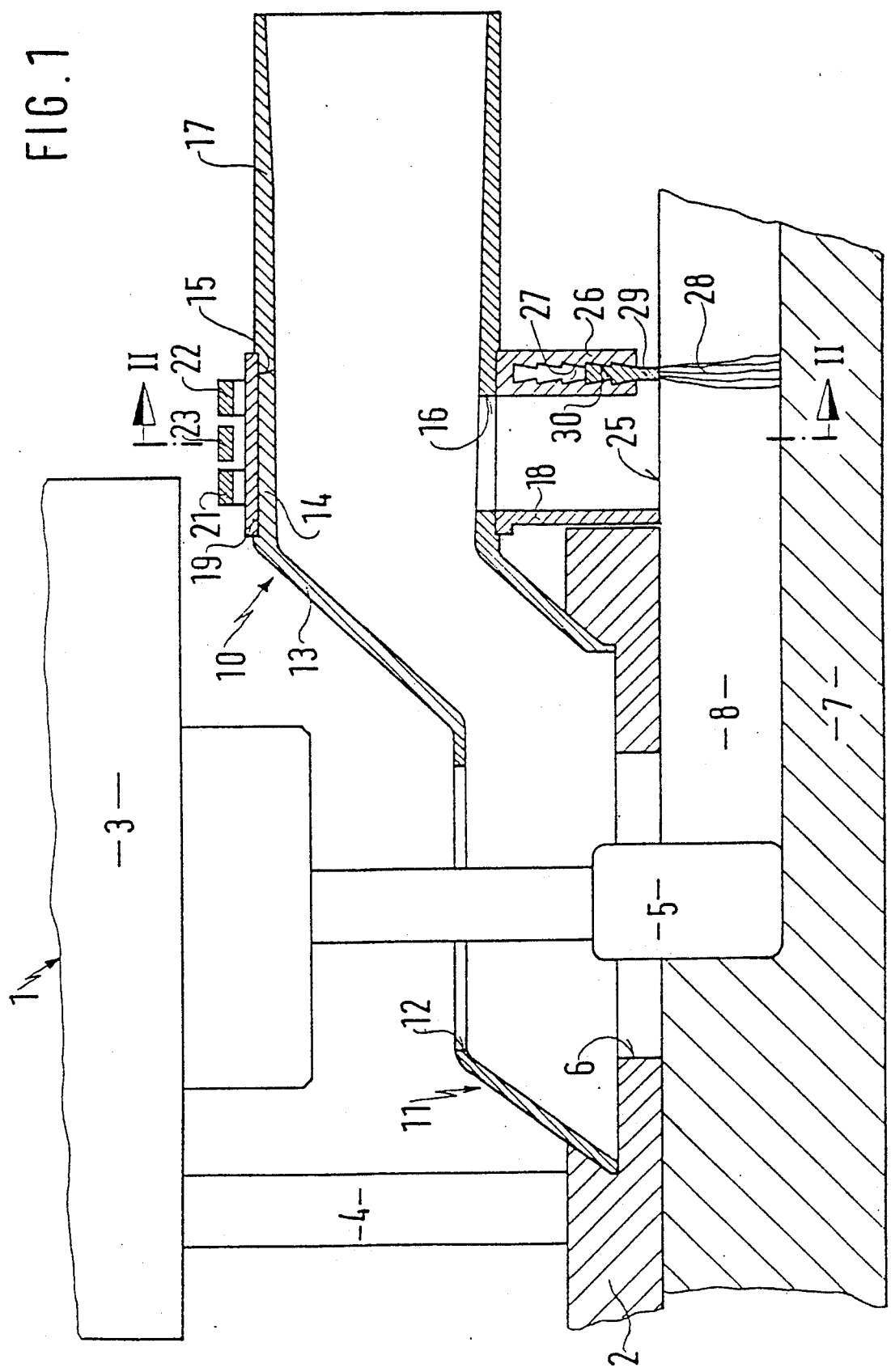
FIG. 1 shows a longitudinal section through the base plate of a mortising machine and a dust removing device.

A known hand-held mortising machine, which is constructed as a recessing and shaping machine 1, substantially has a base plate 2 and a motor housing 3 which are connected with one another via columns 4 so as to be adjustable with respect to height. A mortising tool 5 which engages through an opening 6 in the base plate 2 projects out of the motor housing. The tool 5 cuts a recess or mortised groove 8 into a workpiece 7 in rotary movement.

A chip removing device 10 is fastened at the base plate 2 of the mortising machine 1 by means of screws or catch locks, not shown. The device 10 has a bell-shaped first suction piece 11 located above the opening 6. The first suction piece 11 is open at the bottom and has, at the upper side remote of the base plate, an opening 12 for the passage of the mortising tool. The suction piece 11 passes into a connecting piece 13 which leads diagonally upward. A central part 14 having a circular, tubular cross section and an axis lying parallel to the base plate 2 adjoins the connection piece 13. The central part 14 has a broad, flat annular groove 15 at its tubular exterior end an opening 16, which is rectangular in the embodiment example and arranged in the area of the flat annular groove 15 on the side facing the workpiece. A connection piece 17 for attaching a suction hose of a suction fan, not shown, adjoins the central part 14 in a continuous manner.

Figure 2:
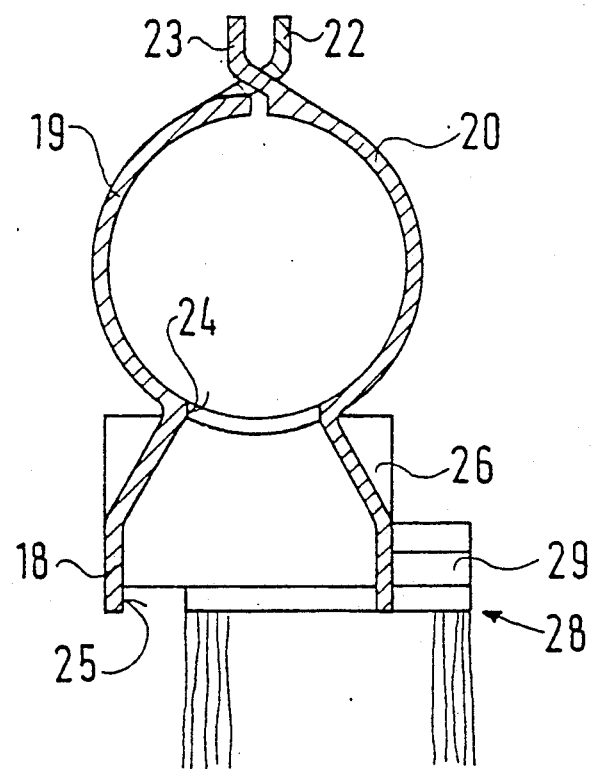
FIG. 2 shows a cross section according to line II—II in FIG. 1.

A suction connection piece 18 is fastened at the central part 14 in such a way that two bent clamping arms 19, 20, which are formed on at the suction connection piece 18, enclose the central part 14 and reach into the flat annular groove 15 (see FIG. 2). They are held there by clamping force. The clamping arm 19 has two actuating elongations 21, 22 at its free end, and the clamping arm 20 has one actuating elongation 23. The actuating elongations intersect one another in the manner of shears.

The suction connection piece 18 has a passage 24 at the top and a suction opening 25 at its lower end. The suction opening 25 can be placed against the workpiece 7 and lies on the same plane as the base of the base plate 2. This second suction opening 25 has a rear wall 26 of increased thickness compared to the first suction piece 11. A twosided sawtooth profile 27, which is open at the bottom and the sides, is worked into the rear wall 26 transversely relative to the axis of the central part 14 in the manner of a slot.

A broom 28 has a haft 29 with a profile 30 corresponding to the profile 27 and reaches with its bristles, to the base of the groove 8 mortised into the workpiece 7. The broom is inserted into the sawtooth profile 27. The connection piece 18 and the broom 28 are at least as wide as the maximum groove width which can be produced with the mortising machine.

The chip removing device 10 can be removed from or inserted into the base plate 2 as required. Prior to the commencement of the mortising work, the broom 28 is fastened in such a way in the rear wall 26 by means of lateral insertion at the height of one of the steps of the sawtooth profile 27 that the bristles of the broom reach until the base of the groove 8.

During mortising, the broom 28 is inserted into the mortised groove 8 and engages in it. The milled chips which are not sucked up via the first suction opening 11 and still remain in the groove 8 are prevented from exiting via the groove 8 by means of the broom 28. The chips are sucked up via the suction connection piece 18, the passage 24 and the opening 16 via the central part 14 and the suction connection piece 17.

If the groove suction via the suction connection piece 18 is not desired, the clamping arms 19, 20 are spread by means of pressing together the actuating elongations 21, 22, 23 and rotated in the annular groove 15. The connection piece 18 is now set away to the side and the opening 16 is closed by means of one of the clamping arms 19, 20.

The suction connection piece 18 can also be entirely removed, e.g. for cleaning purposes, by spreading apart the clamping arms 19, 20 by means of vigorously pressing together the actuating elongations 21, 22, 23 until the clamping arms 19, 20 can be removed from the annular groove 15.

The invention is not limited to the shown embodiment example. For example, the second suction opening can also be worked directly into the base plate of the mortising machine or can comprise a duct which is completely separate from the suction duct of the first suction opening. The broom can be fastened at the chip removing device in a desired manner, particularly also by means of screw or snap connections. The broom can also be equipped with rings of some other kind of resilient material instead of with bristles. The sealing function relative to the groove can also be assumed by some other resilient body which adapts itself to the shape of the mortised groove.

We claim:

1. A hand-held mortising machine, comprising a base plate to be placed on a surface of a workpiece to be machined, and having an opening; a mortising tool extendable through said opening of said base to penetrate into the workpiece for removing chips and producing a groove-like recess in the workpiece; and a chip removing device having a first suction opening in an area of said opening of said base plate; a second opening spaced from said first opening to open in an area of the groove-like recess; and a suction connection member for communicating said second opening with a suction space of said chip removing device.

2. A hand-held mortising machine as defined in claim 1, wherein said chip removing device further has a tubular member having a circular cross-section and communicating said first and second opening with the suction space, said suction connection member being rotatable about said tubular member.

3. A hand-held mortising machine as defined in claim 2, wherein said suction connection piece has two resilient clamping arms embracing said tubular member.

4. A hand-held mortising machine as defined in claim 3, wherein said clamping arms have actuating elongation operative to spread said clamping arms apart to thereby detach said suction connection member from said tubular member.

5. A hand-held mortising machine as defined in claim 2, further comprising a deformable body arranged in a region of said second suction opening for projecting into the groove-like recess to sealingly hold back milled chips.

6. A hand-held mortising machine as defined in claim 5, wherein said deformable body is a broom.

7. A hand-held mortising machine as defined in claim 5, wherein said deformable body is vertically adjustably supported in said suction connection member, said second suction opening being formed in a free end of said suction.

8. A hand-held mortising machine as defined in claim 1, wherein said suction connection member has a wall having an inner sawtooth profile, said deformable member being a broom having a haft with a profile corresponding to said sawtooth profile.

9. A hand-held mortising machine as defined in claim 1, wherein said mortising tool has a predetermined diameter, said second suction opening having a width which is at least equal to said predetermined diameter.

10. A hand-held mortising machine as define din claim 1, wherein said second opening is located beyond said base plate.

* * * * *